April 7, 1970  C. S. TURBEVILLE ET AL  3,504,454

FISH LURE

Filed July 10, 1968

INVENTORS
CLARENCE S. TURBEVILLE
IKE J. WALKER

Richards, Harris & Hubbard
ATTORNEY

United States Patent Office 3,504,454
Patented Apr. 7, 1970

3,504,454
FISH LURE
Clarence S. Turbeville and Ike J. Walker, Gainesville, Tex., assignors to Bomber Bait Company, Gainesville, Tex., a corporation of Texas
Filed July 10, 1968, Ser. No. 743,755
Int. Cl. A01k 85/00
U.S. Cl. 43—42.11                                    8 Claims

ABSTRACT OF THE DISCLOSURE

An underwater lure having a body with a head and tail section, a hook extending from the tail section, and a spoon positioned above and parallel with the body which is retained by an upwardly extending extension member having a portion connected to the eye of the hook and embedded in the head of the body. A method of making this fish lure is also provided.

---

This invention relates to fish lures.

One object of this invention is to provide a novel underwater fish lure which will not easily hang or snag on underwater obstructions.

Another object of this invention is to provide a method for making a novel underwater fish lure.

According to one embodiment of this invention, a novel underwater fish lure is provided having a slightly elongated body with head and tail sections, a hook mean rigidly extending from the tail section, and a spoon positioned above the body and parallel therewith which is attached to a suspension member extending upwardly and forward from the head of the lure.

According to another embodiment of this invention, a method of producing a lure of the above embodiment is provided.

This invention can be more easily understood by a study of the drawings in which.

Figure 1:
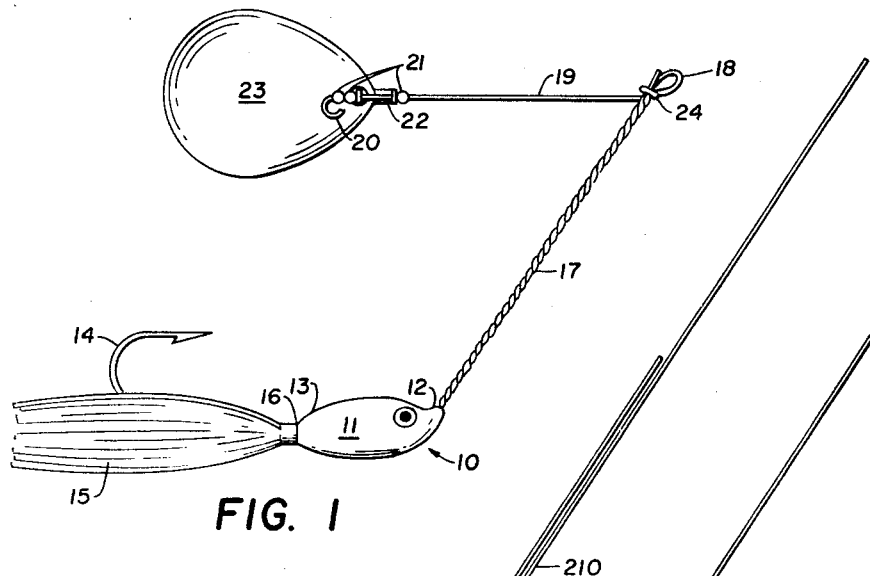
FIGURE 1 is a side elevational view of a preferred lure of the invention.

Now referring to FIGURE 1, the lower portion of lure 10 comprises a body section 11 which is made from a material of greater density than water, preferably lead. Body 11 comprises nose section 12 and tail section 13. An upturned fish hook 14 is rigidly attached to body 11 and extends from the tail section 13. Skirt 15 is made from a series of flexible, elongated plastic strips such as polyethylene strips, and is attached around the shank of hook 14 at point 16 adjacent to the end of tail section 13.

Suspension member 17 is attached to body 11 and extends forwardly and upwardly from nose section 12. Generally, the angle between the shank of hook 14 and suspension member 17 is greater than 90° but less than 180°, preferably from 120°–130°. Loop 18 is positioned on the upper end of suspension member 17 and functions as the means for attaching a fish line to lure 10. Parallel support arm 19 extends from the upper region of suspension member 17 toward the rear of body 11 and substantially parallel thereto. The rear end of parallel support arm 19 is bent to form loop 20 and thereby retains beads 21 and U-shaped rotational member 22 thereon. Spoon 23 is pivotally mounted on U-shaped rotational member 22. It is preferred that spoon 23 have a shiny light reflectant surface.

Figure 2:
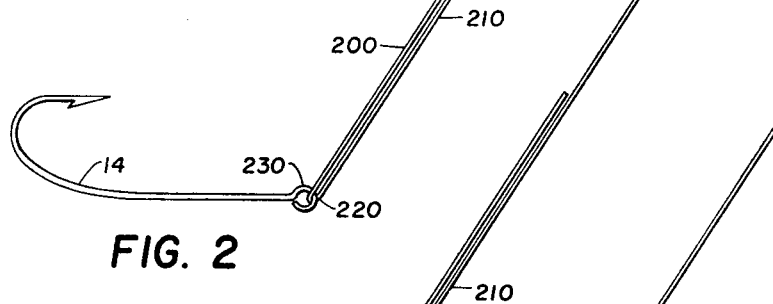
FIGURES 2–4 are schematic illustrations showing the sequential steps of making the lure illustrated in FIGURE 1.

Now referring to FIGURES 2–4, the process for producing the lure of FIGURE 1 will be explained. First referring to FIGURE 2, the initial step is to bend a length of wire 180° to form a short section 200 which overlaps a longer section 210 thereby forming a U-bend 220. Generally, section 210 is from one and one-half to two and one-half times the length of section 200. Next, one of the wire sections is run through eye 230 of fishhook 14 so that the fishhook is retained on U-bend 220 between sections 200 and 210.

Figure 3:

Now referring to FIGURE 3, body 11 is molded on fishhook shank 240, and around the junction between fishhook eye 230 and U-bend 220. As previously stated, body 11 is preferably made of lead, but can be made of any heavy material which will not only function as the hardened body section, but also as the sinker for the lure. When body 11 is solidified, the coupling between fishhook eye 230 and U-bend 220 is rigidly fixed as illustrated in FIGURE 3.

Figure 4:
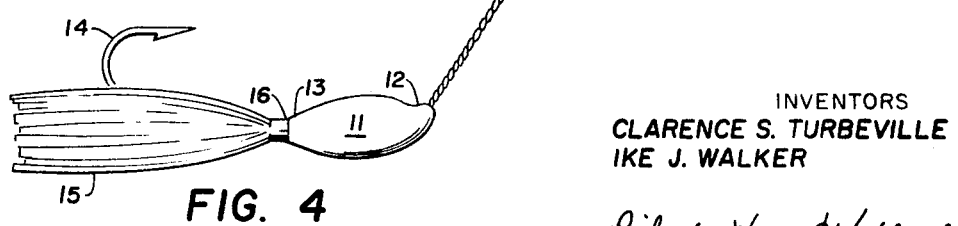

The next step is to twist sections 200 and 210 to form the helically wound suspension member 17 as illustrated in FIGURE 4. Skirt 15 can now be attached around shank 240 adjacent the rear end section 13 by suitable means such as glue or cement.

In the next step of the process, section 210 is bent downwardly and then upwardly in a circular motion to form loop 18, and then wrapped completely around the upper portion of the helically wound suspension member 17 under loop 18 to form wrap 24. After wrap 24 has been made, the resulting portion of section 210 is extended directly over and substantially parallel with shank 240 to thereby form parallel support arm 19. Next, bead 210 and U-shaped member 22 carrying spoon 23 can be inserted on parallel support arm 19 and the end of parallel support arm 19 can be bent to form loop 20.

Lure 10 functions very effectively as an underwater fish lure. After lure 10 has been cast into the water and is being reeled to the fisherman, it will position itself in a plane substantially parallel to the surface of the water. Also, the action of spoon 23 which is pivotally mounted on U-shaped connection member 22 which, in turn, is rotatably mounted on parallel support arm 19 not only acts to stabilize lure 10, but its pivoting and rotating actions about parallel support arm 19 function to attract game fish as light is reflected from its shiny surface. If an underwater obstruction lies in the path of the lure, it will be contacted by suspension member 17, thereby causing the lure to ride over the obstacle.

Although this invention has been described with respect to its preferred embodiments, it should be understood that many variations and modifications will be apparent to those skilled in the art, and the above described preferred embodiments are not intended to limit the scope of this invention.

What is claimed is:

1. An underwater fish lure comprising:
   (a) a molded body having a head and a tail section;
   (b) a fishhook means having its eye molded into said body and its shank extending from said tail section;
   (c) a suspension member made of a spirally twisted single wire having a loop at one end passing through said fishhook eye and molded into said body in a fixed position such that said member extends upwardly and outwardly from said head section;
   (d) fishing line attachment means operatively connected to the upper and outer end of said suspension member;
   (e) a support arm means attached to the upper end of said suspension member and extending substantially above and parallel to said body; and
   (f) a spoon pivotally mounted on said support arm means.

2. The underwater lure of claim 1 further comprising a skirt means made from several thin, elongated flexible strips, said skirt means being attached to said shank adjacent said tail section.

3. A method of forming a fish lure comprising:
   (a) bending a short wire section 180° over a long wire section forming a narrow U bend therebetween, and suspending the eye of a fishhook on said U bend;
   (b) molding a lure body around the upper shank of said fishhook, said fishhook eye and said U bend and rigidly coupling said shank relative to said wire sections at an angle greater than 90° but less than 180°;
   (c) spirally twisting said short and long wire sections together throughout the length of said short section;
   (d) forming a loop with said long section adjacent the end of said short section;
   (e) wrapping said long section at least one turn around the resulting spiral and beneath said loop; and
   (f) bending the resulting end of said long section to a position substantially over and substantially parallel with said molded body.

4. The product formed by the method of claim 3.

5. The method of claim 3 further comprising rotatably mounting a spoon on the resulting end of the long section defined by (f), and attaching a skirt made from thin strips of a flexible material to said fishhook shank adjacent the end of said body.

6. The lure formed by the method of claim 5.

7. The underwater lure of claim 1 wherein said fishing line attachment means comprises a loop formed in said wire on the upper and outer end of said suspension member.

8. The fishing lure of claim 7 wherein said support arm means comprises an extended end of said wire wrapped at least one turn around said suspension member and beneath said loop, and bent to a position substantially over and substantially parallel with said molded body.

References Cited

UNITED STATES PATENTS

| | | | |
|---|---|---|---|
| 2,168,894 | 8/1939 | Arbogast | 43—42.17 X |
| 2,778,144 | 1/1957 | Jones et al. | 43—42.11 |
| 3,093,923 | 6/1963 | Jackson | 43—42.11 |
| 3,143,824 | 8/1964 | Thomas | 43—42.11 |
| 3,226,875 | 1/1966 | Woolums | 43—42.17 |

WARNER H. CAMP, Primary Examiner

U.S. Cl. X.R.

43—42.19, 42.28, 42.37, 42.49, 42.53